United States Patent Office 2,952,624
Patented Sept. 13, 1960

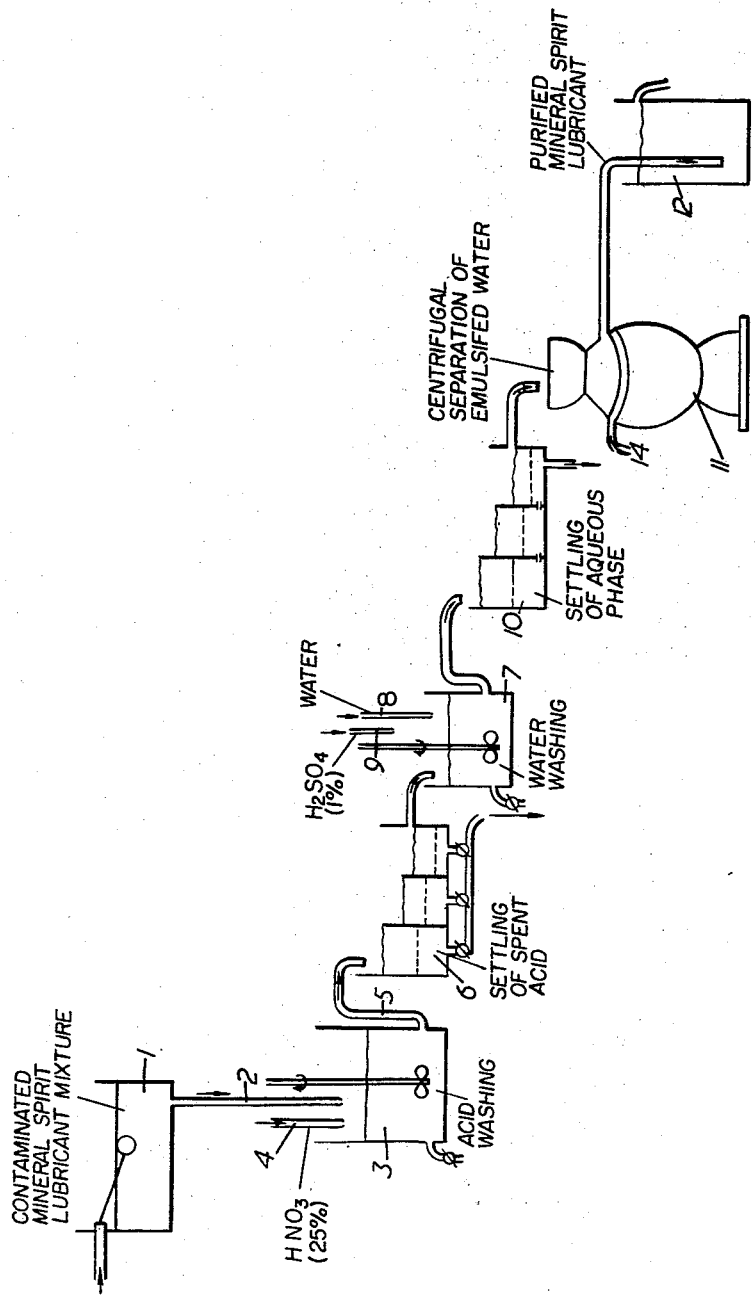

2,952,624

ACID PURIFICATION OF HYDROCARBON LUBRICANTS CONTAMINATED BY ALUMINUM SALTS

Leslie Lister, Adderbury, and Francis M. P. Meredith, Banbury, England, assignors to Aluminium Laboratories Limited, Montreal, Canada, a corporation of Canada Filed Aug. 5, 1957, Ser. No. 676,106

Claims priority, application Great Britain Aug. 7, 1956

7 Claims. (Cl. 208—181)

The present invention relates to an improved method of cleaning volatile hydrocarbons which have become contaminated with finely divided aluminum and/or aluminum salts.

The principal application of the present invention is to the cleansing of mineral spirits or other volatile hydrocarbons which have been employed in the conversion of aluminum powder to flaked aluminum paste used as a paint pigment.

In one well-known method of producing such aluminum paste, aluminum powder is ball-milled in mineral spirits to which a lubricant, such as a fatty acid, has been added. In practice the lubricant is usually commercial stearic acid (actually a mixture of stearic and palmitic acids). The slurry resulting from the ball milling process is filtered and the filtrate is used for making up a further ball milling charge. The filtrate consists of mineral spirits with, for example, about 20 gms./litre stearic acid dissolved in it. It is found that aluminum fatty acid salt in solution or colloidal suspension and very finely divided aluminum gradually build up in the mineral spirit and after the mineral spirit has been used in the process for a number of mill runs, these contaminants begin to have a deleterious effect on the quality of the aluminum paste, in that the total reflectivity or "whiteness" of paint made from the pigment is diminished.

It is current practice to operate the process with a stock of mineral spirit from which the mill charge is made up and to which the filtrate is returned, but it is found that the product deteriorates as the spirit becomes more and more contaminated by aluminum fatty acid salt and metallic aluminum particles.

It has already been proposed to cleanse the mineral spirit (or other volatile hydrocarbon employed) either after each mill run or at intervals. This can be done, for example, by distillation. However, this is expensive in plant and running cost and the recovery is not complete. Moreover, the dissolved lubricant remains in the still residue and is not easily recoverable, which represents a serious loss.

It is also known that the contaminating aluminum fatty acid salt can be decomposed by treating the mineral spirits with aqueous mineral acid accompanied by agitation, so that the fatty acid is not removed from the spirits. At the same time the finely divided aluminum can be dissolved by the acid or the stability of its suspension in the mineral spirits changed by the destruction of the stabilizing aluminum fatty acid salt so that it can be removed by settlement.

It has, however, been found that the speed of the reaction with mineral acid is very dependent on the nature of the acid and also on the agitation, i.e. the area of contact and speed of renewal of this contact. Thus, with moderately dilute sulfuric acid (10–50%), the reaction is very slow unless gross excess of acid and violent agitation are used. Below about 10% strength the reaction with sulfuric acid becomes impossibly slow. With strong sulfuric acid the reaction is not confined to the aluminum salt but the mineral spirit is itself attacked. Thus a convenient industrial process is not possible with sulfuric acid, as the acid cannot be used to exhaustion. With hydrochloric acid the process is faster, but still very dependent on the strength of the acid and the speed of agitation, so that again the acid cannot be readily used to exhaustion. Moreover, with hydrochloric acid a very small amount of a reactive chloride compound is left in the cleansed spirit which seriously diminishes the leafing property of aluminum paste made from it and the chloride would also cause the undesirable corrosion of the polished steel balls in the ball mills.

While this chloride compound can be removed from the treated mineral spirits by the simple expedient of passing the spirits through a bed of aluminum turnings or powder, the reaction is slow and desirable rates of the separation of the chloride from the spirits can only be achieved by the use of relatively complex apparatus.

We have now found the very surprising result that, despite its well-known passivating action on aluminum, aqueous nitric acid may be employed to cleanse mineral spirits contaminated with aluminum stearate or like aluminum salt of a fatty acid and that the aluminum salt is decomposed very rapidly with almost complete exhaustion of the nitric acid, which may be added at 5–50% strength in amounts not appreciably in excess of the stoichiometric amount required for the decomposition of the aluminum stearate or other fatty acid salt of aluminum. A volume of 16% solution of nitric acid, for example, stoichiometrically equivalent to the amount of aluminum present in the form of aluminum stearate and finely divided particles of the metal (which can be determined from the ash value of the spirits) is added to the contaminated spirits in a suitably resistant tank and is found to convert almost all the aluminum stearate to stearic acid in about ten minutes at atmospheric temperature when strongly agitated together. The finely divided particles of aluminum are simultaneously converted into a form which is easily settled from the mineral spirits on being allowed to stand or are dissolved.

After the washing with nitric acid, a large proportion of the reacted acid and metallic aluminum may be removed by settlement by gravity. However, it has been found that a small proportion of nitric acid or its reaction product is retained in the mineral spirits (which contains stearic or other fatty acid) in solution or suspension. Although this proportion is very small, it is highly deleterious to the metallic surfaces of the components of the mill and to the leafing properties of aluminum paste pigment made with the acid-washed mineral spirit.

To remove the acid or reaction product, which interferes with the leafing quality of aluminum paste and which would also corrode all metal parts of the mill and, in particular, would seriously impair the polished surface of the steel balls, the mineral spirit is agitated with a volume of water preferably equal to or less than the volume of the mineral spirit. In this aqueous washing the water becomes emulsified in the spirit by reason of the effect of the fatty acid present, but can be separated at least in part by gravity settlement, providing that care is taken to exclude any substantial concentration of metallic ions from the aqueous washing stage. The remaining emulsion may, however, be broken in a number of ways which will be obvious to those skilled in the art. One convenient method is to warm the emulsion to 60–70° C. when it rapidly separates. This is, however, somewhat hazardous and it is in consequence preferred to break the emulsion by centrifugal action, for which purpose many commercial machines are available. A centrifugal separator giving a high acceleration of the order of 10,000 g. is preferred.

The process for cleaning mineral spirits, having a proportion of a fatty acid or like lubricant substance dissolved therein to remove aluminum contaminants therefore comprises agitating the mineral spirit with aqueous nitric acid, preferably of a strength of 5–50%, for a time sufficient to secure the substantial decomposition of aluminum salts of the fatty acid, agitating the mineral spirits with water and separating the resulting mineral spirit/water emulsion.

Although in some cases the spent acid is allowed to separate from the mineral spirit after the acid washing stage and before the water washing stage, in other cases it is convenient to add the washing water directly to the mixture of spirit and acid, as by this means the settling stage is avoided. In practice, however, it is found to be desirable to incorporate a settlement stage between the acid washing stage and the aqueous washing stage and again between the aqueous washing stage and the centrifuge.

A convenient test has been devised for testing whether the treated mineral spirit/lubricant mixture has been freed from residual nitric acid or its reaction products. The test consists in placing a bright steel object, such as a steel ball, in the spirit and observing any dulling or staining of the surface. If none occurs within 24 hours, the spirit is satisfactory for further use and the nitric acid or aluminum salt has been sufficiently removed.

The present invention provides not only a real economy in the utilization of mineral spirit in the production of aluminum paste pigment by the ball milling method, but also a method of producing aluminum paste pigment of a more consistent quality than has been possible where the mineral spirit has been used for a given number of cycles and then discarded.

It will be appreciated that if a proportion of the mineral spirit is withdrawn from the ball mill after each cycle and fed to a cleansing plant in which the mineral spirit is cleansed in accordance with the method above described, the cleansed spirit being recycled to the ball mill, it will be possible to maintain the amount of aluminum contamination of the spirit in the ball mill to a fairly constant and acceptable value.

In order to achieve this result a cleansing plant shown diagrammatically in the drawing is employed.

Contaminated mineral spirit/lubricant mixture from the ball mill is fed into a tank 1 and spirit from the tank 1 is fed through a pipe 2 into a mixer 3. At the same time 25% volume/volume aqueous nitric acid is fed co-current into the mixer 3 through a pipe 4 from a separate storage. The contaminated spirit and nitric acid are subjected to violent agitation in the mixer 3, while at the same time the spirit/spent nitric acid mixture is continuously withdrawn from the mixer 3 through the outlet pipe 5 to the settlement vessel 6.

The contaminated spirit is fed into the mixer 3 at a fairly constant rate of, for example, 100 gallons/hour. Nitric acid is supplied in excess of the stoichiometric quantity required to convert all the aluminum to aluminum nitrate. If, for example, the spirit is returned for cleansing when its ash value reaches 1 gm./litre, then 25% nitric acid is fed in at the rate of about 2½ gallons/hour. This figure may be adjusted somewhat in practice according to the ash value of the contaminated spirit.

The volume of the mixer 3 is such as to give a "dwell" period of at least forty minutes to give time for substantially complete decomposition of the aluminum acid salt present in the contaminated spirit.

The emulsified mixture continuously overflows from the mixer 3 into the settlement vessel 6 which is provided with a series of weirs as shown. The main bulk of the aqueous phase containing the spent nitric acid settles and is continuously or intermittently bled off from the vessel 6 for neutralization and disposal. The provision of the vessel 6 greatly assists the smooth working of the process, although it can be omitted. The supernatant liquid from the vessel 6 overflows into an aqueous washing mixer 7 co-current with water which is fed in at 100 gallons/hour (i.e. in approximately equal volume) through pipe 8 and the two are vigorously agitated together.

It is found that any appreciable concentration of metallic ions in the aqueous washing stage or the presence of aluminum stearate can lead to the formation of a very stable emulsion which it is difficult to break. If hard water is used for washing or if any aluminum stearate penetrates to this stage, the calcium or aluminum stearate appears to have a stabilising effect on the emulsion.

This can be avoided by using washing water de-ionized by a complexing agent such as ethylene diamine tetra-acetic acid and by controlling the acid washing so that no appreciable quantity of aluminum stearate is carried forward.

However, the difficulty may be overcome in a much more simple fashion by slightly acidifying the wash water with sulfuric acid to bring the pH value of the mixer numerically smaller than pH 4; to about pH 2, for example. For this purpose 1% sulfuric acid is fed into the washing mixer 7 through a pipe 9 at the rate of 1 gallon/hour. The volume of the mixer 7 must be such as to give a dwell time of at least 12 minutes for the mineral spirit passing through it.

The resulting emulsion is continuously led out through a pipe to a further weired settlement vessel 10, in which the bulk of the aqueous phase separates out and is led off to waste, while the cloudy supernatant spirit is passed to a centrifugal separator 11, from which the separated mineral spirit/lubricant phase is led to a tank 12, from which it is fed back to the ball mill. A small proportion of a thick emulsion is discharged as a heavy phase to waste through a pipe 14 from the separator 11.

It will be appreciated that fatty acid is regenerated in the mineral spirit by reason of the action of the nitric acid on the aluminum fatty acid salt. It is, in consequence, possible that the fatty acid concentration will increase to a point at which it begins to separate from solution, and come out in the solid state. This could lead to clogging of the centrifugal separator 11 and to avoid this difficulty, which will only be encountered when the fatty acid content of the mineral spirit to be cleansed is high, it may be desirable to employ warm wash water at a temperature of about 30° C. in the washing mixer 7, so as to maintain the mineral spirit at a temperature at which the fatty acid remains in solution in the mineral spirit, and the use of warm wash water is in any event beneficial in assisting to break the residual emulsion.

As a typical example of the effect of the treatment reference can be made to the following table of results obtained in the cleansing of mineral spirits used in ball-milling aluminum powder to produce aluminum paste pigment.

|  | Before Treatment, gms./litre | After Treatment, gms./litre |
| --- | --- | --- |
| Ash Value | 1.07 | 0.05 |
| Water Content | 0.028 | 0.022 |
| Stearic Acid Content | 23.2 | 24.6 |

The increase of stearic acid content is due, as noted above, to the regeneration of stearic acid by the decomposition of aluminum stearate. The recovery of spirit by the process was at least 98%. The cleansed spirit was perfectly satisfactory for the production of aluminum paste pigment and produced results very nearly equal to those obtained with clean new spirit.

The following characteristics were obtained in aluminum paste pigment produced in the same mill and under the same conditions:

| | Non-volatile content | Water covering area, cm.²/gm. | Leafing, percent | Reflectivity, percent | |
|---|---|---|---|---|---|
| | | | | T | S/T |
| Standard new spirit | 65.0 | 14,050 | 83 | 71.8 | 57.8 |
| Acid treated spirit | 65.2 | 13,890 | 82 | 69.6 | 56.1 |

The values of the non-volatile content, the water covering area and leafing were determined by the methods described in British Standard Specification 388:1952 entitled "Leafing Aluminum Flake (Powder and Paste) for Paints"; the total reflectivity T was determined as a percentage of the total reflectivity of a block of magnesium oxide using a Guild reflectometer and the ratio S/T of the specular to the total reflectivity of the paint made up from the paste was determined using the same instrument. No staining or discoloration of the steel balls in the mill or any other adverse effect was noticed due to the use of acid washed spirit.

In an extended series of trials in which the mineral spirits were cleaned as soon as the ash content had risen to an undesirable level, the paste which was produced, and the paint made from it using the cleaned spirit, had characteristics very similar to those enumerated in the above table of results and easily satisfied the requirements stipulated in British Standard 388:1952.

We claim:

1. A method of cleansing volatile hydrocarbons contaminated with fatty acid salts of aluminum comprising vigorously mixing the hydrocarbon with aqueous nitric acid of a strength within the range of 5-50% and in an amount at least equal to the stoichiometrical amount required to decompose all the fatty acid salt of aluminum present in the volatile hydrocarbon and subsequently separating the hydrocarbon from the spent aqueous nitric acid.

2. A method according to claim 1, wherein the volatile hydrocarbon is mineral spirit containing a proportion of a fatty acid and is withdrawn from a ball-milling operation in which aluminum powder is converted to flaked aluminum paste.

3. A method according to claim 1, in which the volatile hydrocarbon is subsequently vigorously mixed with water to wash out traces of nitric acid therefrom.

4. A method according to claim 3, wherein the water is slightly acidified to bring the pH value of the water numerically smaller than 4.

5. A method according to claim 3, wherein the resulting emulsion is subsequently broken by centrifugal action.

6. A method of cleansing mineral spirits containing a proportion of a fatty acid and contaminated with aluminum fatty acid salt, comprising feeding contaminated mineral spirits and aqueous nitric acid of a strength within the range 5-50% into a mixing vessel in proportions such that there is at least sufficient nitric acid to decompose all the contaminating aluminum fatty acid salt, vigorously mixing the mineral spirits and aqueous nitric acid together, leading the mixture from the mixing vessel to a settling vessel, leading the supernatant mineral spirits from the settling vessel to a second mixer, adding water to the second mixer at a rate at least approximately as great as the rate at which the spirits are introduced from the settlement vessel, withdrawing emulsified liquid from the second mixer and leading it to a second settlement vessel, leading the supernatant liquid from the second settlement vessel to a centrifugal separator, and collecting the light mineral spirit phase from the centrifugal separator.

7. A method according to claim 6, wherein sulfuric acid is added to the second mixing vessel at a rate sufficient to maintain the pH of the aqueous phase at a value of about 2.

References Cited in the file of this patent

UNITED STATES PATENTS

| 1,742,263 | Koch | Jan. 7, 1930 |
| 2,339,520 | Riesmeyer | Jan. 18, 1944 |
| 2,518,353 | McKinnis | Aug. 8, 1950 |